UNITED STATES PATENT OFFICE.

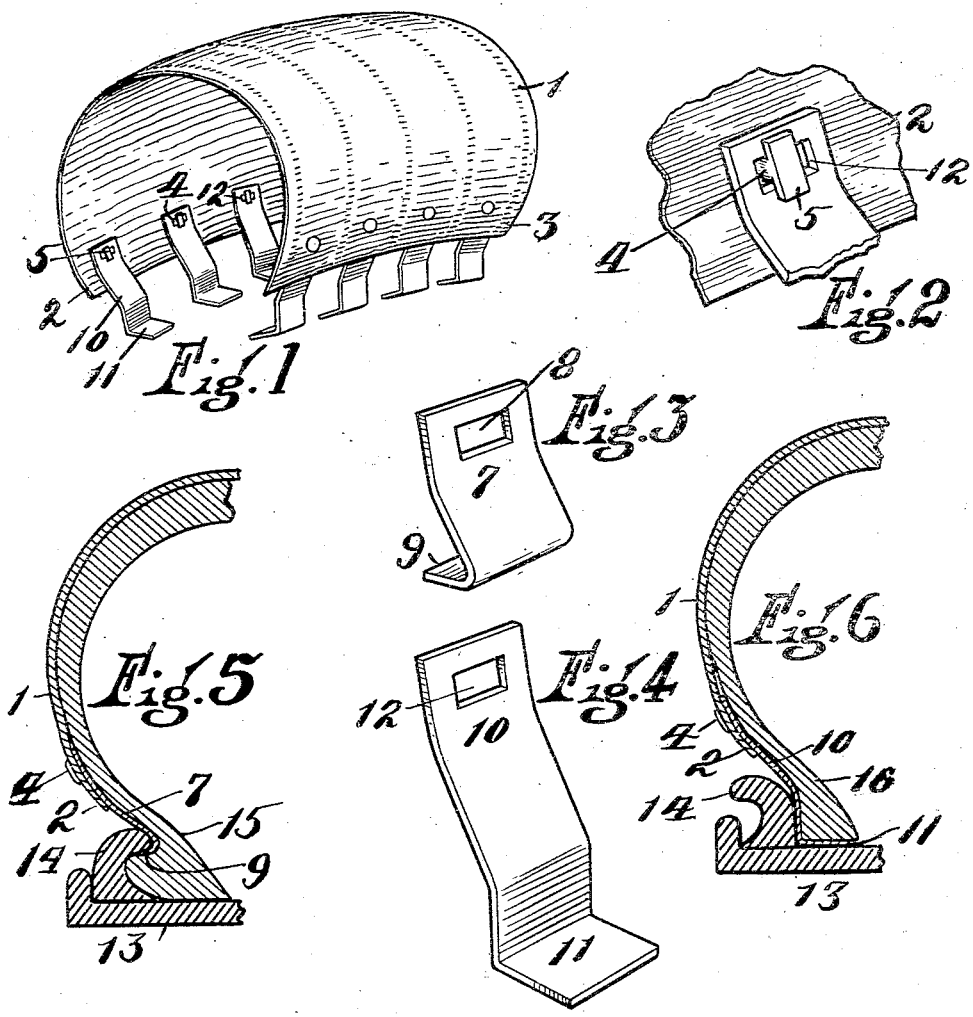

RALPH WILLIAM WHEELER, OF AKRON, OHIO.

PATCH FOR TIRES.

1,159,143.  Specification of Letters Patent.  Patented Nov. 2, 1915.

Application filed October 28, 1913.  Serial No. 797,877.

*To all whom it may concern:*

Be it known that I, RALPH WILLIAM WHEELER, a citizen of the United States, residing at Akron, in the county of Summit and State of Ohio, have invented new and useful Improvements in Patches for Tires, of which the following is a specification.

This invention relates to devices for patching the outer casings of pneumatic tires and the object of the invention is to provide a suitable inexpensive patch adapted to close any opening in the casing of a pneumatic tire and hold the material of the casing surrounding the opening against enlargement of the opening and generally to provide for a quick repair of the casing.

More specifically, the invention resides in providing the patch with coupling devices for holding various forms of clips on the patch to thereby enable it to be used with different types of tires, suited to different types of rims, that is to say, detachable clips may be provided for the patch adapting it for use in connection with a clencher tire and if the patch is to be used with a straight-side tire of the Dunlop type different clips may be substituted.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1, is a perspective view of my improved patching device equipped with clips for attaching it to a rim suited to receive a straight-side or Dunlop type of tire; Fig. 2, is a perspective view enlarged of the coupling device employed; Fig. 3, is a perspective view of a clip for use in connection with a rim adapted to hold a clencher type of tire; Fig. 4, is a similar view of a clip for use in connection with the device when employed with a rim suited to take a straight-side or Dunlop type of tire. Fig. 5, is a transverse sectional view of a vehicle wheel rim adapted to receive a clencher type of tire showing one form of clip in position; Fig. 6, is a similar view of a tire showing another form of clip in position with respect to a straight-side type of tire.

Referring to the drawings in detail, the reference numeral 1 denotes the body portion of the patch which is usually formed of rubber and fabric in a conventional manner, but the construction of the patch forms no particular feature of this invention, excepting that it is usually in the form of a sleeve having an inner open portion provided with side edges 2 and 3 in the usual manner.

Adjacent to the side edges 2 and 3 are a plurality of studs each preferably provided with a shank portion 4 and an enlarged head 5. These studs may be formed as shown in Fig. 2, wherein the heads are rectangular in form or may be fashioned as shown in Fig. 7 where the head of the stud is circular and crowned; this form of stud is designated by the reference numeral 6.

Adapted to coöperate and interengage with the studs are clips fashioned to coöperate and interengage with various types of rims. In the drawings the reference numeral 7 denotes a clip fashioned to interengage with a clencher rim and provided with an elongated rectangular opening 8 extending transversely of the longitudinal side of the clip so that when positioned it will interlock with the head 5 of the stud and this interlocking is effected by placing the clip in position parallel to the side edge of the patch and after passing the head 5 of the stud 4 through the opening 8 it is given a one-quarter revolution to bring the hook-shaped end 9 of the clip inwardly to project below or inwardly from the side edge 2 of the patch.

In Fig. 4 is shown a clip 10 provided with a horizontally-extending inner end 11 to seat on the tire-seating surface of a rim suited for a straight-side tire of the Dunlop type and this clip is provided with an opening 12 similar to the opening 8 and functioning in the same manner.

In Fig. 5 is shown a wheel rim 13 provided with a tire-holding band 14 and with a clencher type of tire 15 positioned thereon. In this view, the clip 7 is secured on the patch 1 by coupling devices 4 and as has already been described, the hook-shaped end 9 of the clip engages the tire-holding ring 14.

In Fig. 6 a rim 13 is shown provided with a tire-holding ring 14 and a portion of the tire 16 of the Dunlop type positioned thereon. In this view the horizontal portion 11 of the clip 10 is shown in engagement with the rim and the tire.

It will be noted that a patch as hereinbefore described may be employed on either type of tire now most commonly used and it is also apparent that by changing the length of the clips employed the patch may be adapted for use with tires of different diameters or of different sizes, as the case may be.

I claim:—

A patching device for pneumatic tires comprising a sleeve-shaped patch open at its inner side to provide side edges embracing the opposite sides of the tire, in combination with a plurality of studs secured to the inner surface of each side of the patch adjacent to said edges, each of said studs having a vertically elongated head and a plurality of clips provided at their outer ends with transversely elongated openings of substantially the same dimensions as said studs to detachably engage said studs to detachably secure the clips thereto, and at their inner ends with rim-engaging portions adapted to be clamped between the tire and a portion of the rim of the wheel.

In testimony whereof I have hereunto set my hand in presence of two subscribing witnesses.

RALPH W. WHEELER.

Witnesses:
C. E. HUMPHREY,
J. GRANT HYDE.